Feb. 3, 1959  P. N. YOUTZ  2,871,544
METHOD OF ERECTING BUILDINGS
Filed Aug. 19, 1955  7 Sheets-Sheet 1
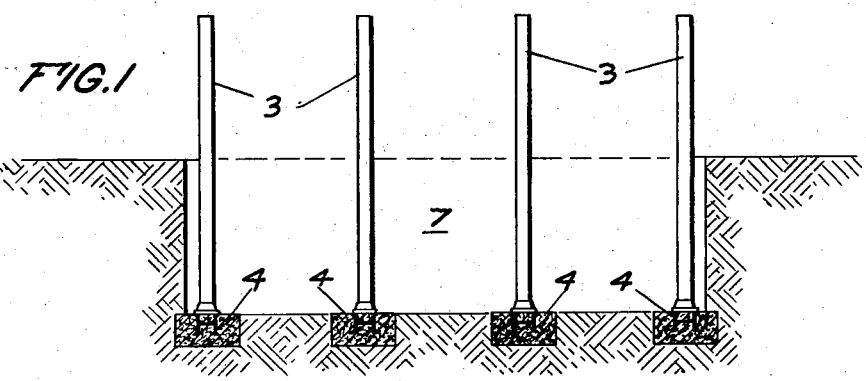
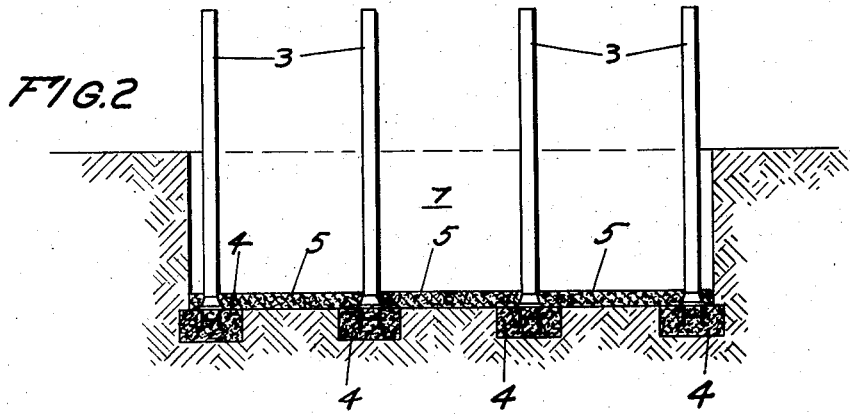
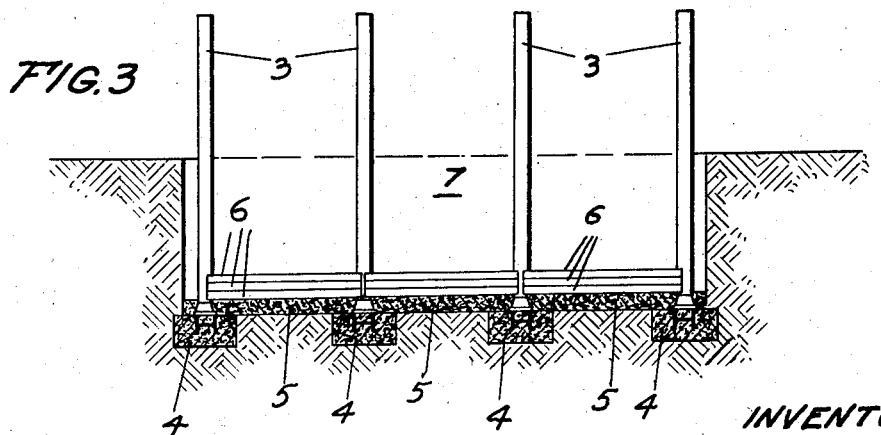
INVENTOR
PHILIP N. YOUTZ
BY Louis C. Smith
ATTORNEY

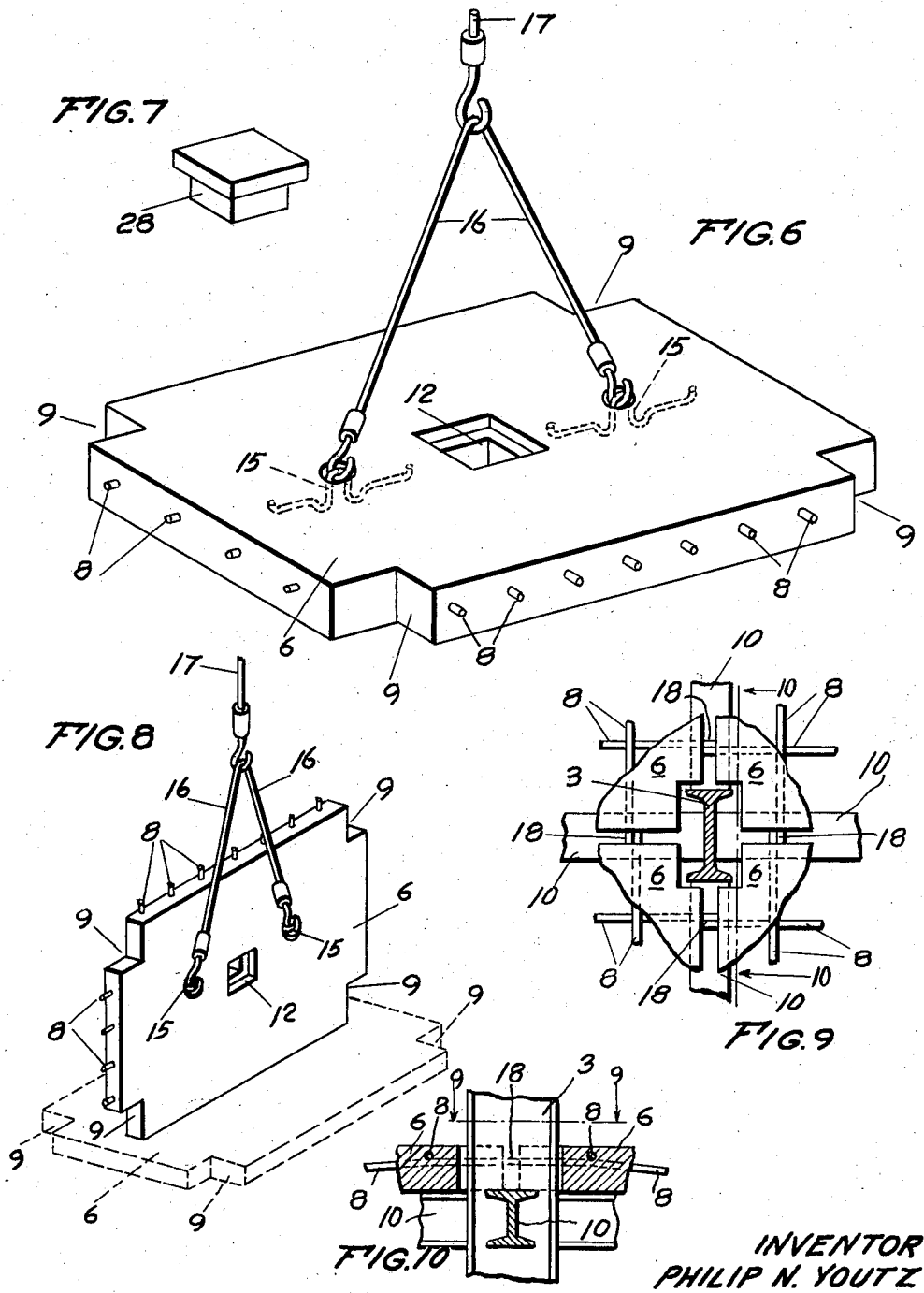

Feb. 3, 1959  P. N. YOUTZ  2,871,544
METHOD OF ERECTING BUILDINGS
Filed Aug. 19, 1955  7 Sheets-Sheet 4
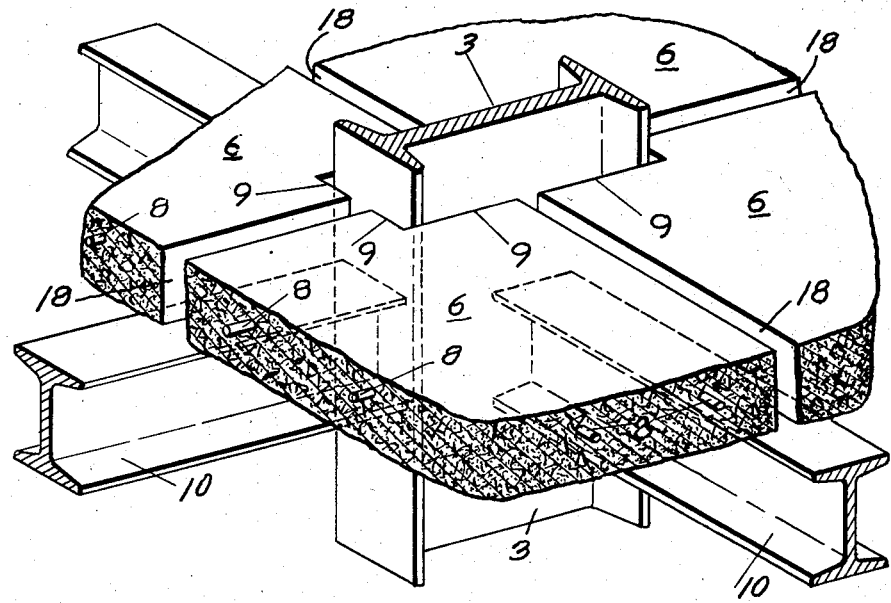
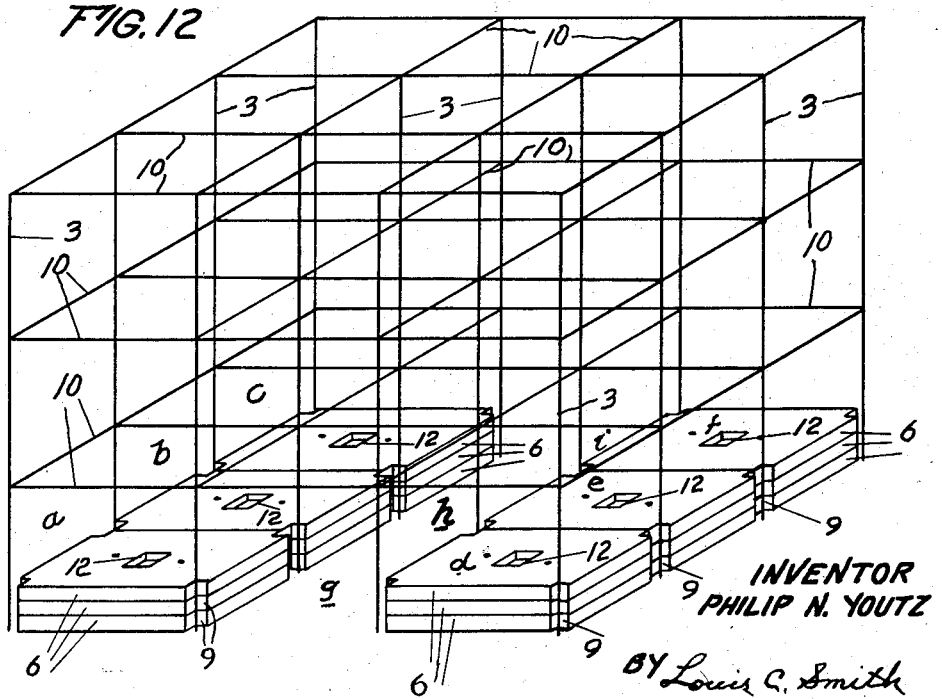
INVENTOR
PHILIP N. YOUTZ
BY Louis C. Smith
ATTORNEY Feb. 3, 1959 P. N. YOUTZ 2,871,544
METHOD OF ERECTING BUILDINGS
Filed Aug. 19, 1955 7 Sheets-Sheet 5

INVENTOR
PHILIP N. YOUTZ
BY Louis C. Smith
ATTORNEY

Feb. 3, 1959 P. N. YOUTZ 2,871,544
METHOD OF ERECTING BUILDINGS
Filed Aug. 19, 1955 7 Sheets-Sheet 6

INVENTOR
PHILIP N. YOUTZ
BY Louis C. Smith
ATTORNEY

Feb. 3, 1959    P. N. YOUTZ    2,871,544
METHOD OF ERECTING BUILDINGS
Filed Aug. 19, 1955    7 Sheets-Sheet 7

INVENTOR.
Philip N. Youtz.
BY Louis C. Smith
Attorney.

United States Patent Office 2,871,544
Patented Feb. 3, 1959

2,871,544

METHOD OF ERECTING BUILDINGS

Philip N. Youtz, Yorktown Heights, N. Y.

Application August 19, 1955, Serial No. 529,525

4 Claims. (Cl. 25—155)

This invention relates to a method of erecting buildings and particularly buildings which include a steel frame or reinforced concrete frame which supports the various floors in the building.

An object of the invention is to provide a novel method according to which the various upper floors of the building are fabricated in bay-size floor units, such units being built or made at or below ground level and placed one on the other to form a stack of such floor units in each of several of the bays of the building, each floor unit being subsequently raised to its proper floor level and mounted on floor-supporting elements secured to the columns of the building, the beams and girders of the frame of the building in one of the bays, constituting one form of such floor-supporting elements.

This method is especially advantageous in the erection of buildings having concrete floors as it saves the expense of building forms at the various floor levels for use in pouring the various floors.

In carrying out the method, the first step is to erect at the building site the steel frame for the building which includes the supporting columns, that are usually placed to divide the floor space of the building into bays, and also horizontal elements such as beams or girders that are connected to the columns at various floor levels, and frequently bound the bays at said levels, said horizontal elements constituting the means for supporting the floors of the bays at the various floor levels.

After the steel frame has been completed, or partially completed, the lowest floor (the cellar or ground floor) is poured around the columns and when the lowest floor has set properly bay-size floor units or panels are poured on the lowest floor in each of several of the bays of the building, such floor units or panels being poured one on the other to form a stack of panels in each of said bays, these floor panels all being thus formed below or at ground level.

After the bay-size floor panels have been fabricated or poured and the frame structure of the building is completed, then the floor panels in each bay are raised one by one to a proper floor level and each panel is placed in its permanent position on the appropriate girders and beams. Each floor panel is of such a size that when it is raised and placed in its permanent position at any floor level the edges thereof overlie and rest on the beams or girders or other horizontal elements that bound the bay at said floor level.

This operation of raising the floor panels from the ground level to the upper story level can be accomplished by the same crane or lifting equipment which is usually used for handling the beams, girders, and column sections during the erection of the steel frame.

A stack of floor panels may be fabricated or poured in each bay of the building, each stack having the floor panels to provide floors for each of the upper stories, and in this case the floor panels in each bay will be lifted in said bay to the proper level and then placed on the appropriate beams and girders.

In the drawings:

Fig. 1 is a view illustrating the first step in the method herein set forth, that is, the erection of column sections at the building site;

Fig. 2 illustrates the second step of the method, that is, the pouring of the lowest or ground floor.

Fig. 3 shows bay size floor units or panels poured in stacks in each of the bays of the building;

Fig. 6 shows the manner in which the individual floor units are attached to the lifting equipment by which each is raised to an upper floor level;

Fig. 7 is a view of the trap door or plug which is used to fill the opening in each floor panel;

Fig. 8 illustrates the lifting of any individual floor panel;

Fig. 9 is a fragmentary sectional view showing one of the columns in section and portions of the floor units which surround the column;

Fig. 10 is a section on the line 10—10, Fig. 9;

Fig. 11 is an enlarged perspective view showing portions of floor units which have been raised and deposited on the beams and girders;

Fig. 12 is a more or less diagrammatic view illustrating another way of carrying out the method;

Figure 4:
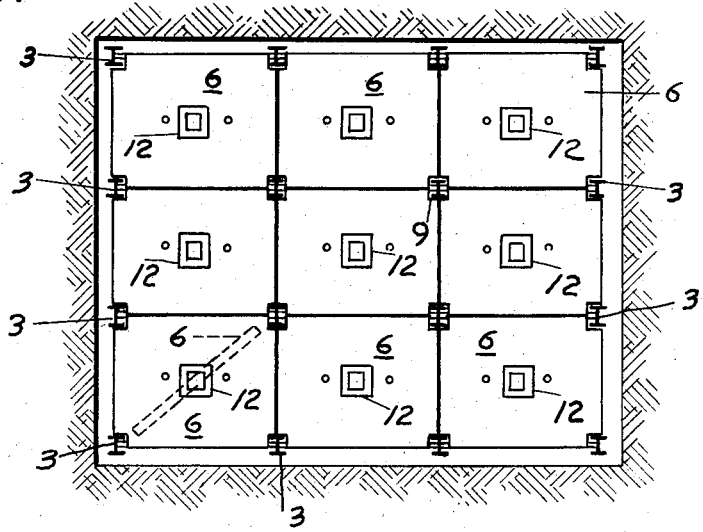
Fig. 4 is a plan view of Fig. 3.

In the illustrated embodiment of the invention my improved method is shown as applied to the erection of a building having a steel frame.

As stated above, the first step in the improved method is to erect at the building site the steel frame of the building, which includes columns 3 that are usually mounted in footings 4 and which may be situated to define the various bays of the building, and which also includes horizontal floor supporting elements 10, such as beams or girders, that are connected to the columns at the various floor levels and are arranged so that they bound the bays at different floor levels.

After the steel frame has been completed or at least after it has been partially completed, the ground floor 5 is poured and this floor may be located at the ground level, or if the building is to have a cellar or basement as indicated in the drawings, an excavation 7 for a cellar or basement will be made and the footings 4 will be placed below the floor of the excavation, and the ground floor 5 will, of course, constitute the floor of the cellar or basement, as shown in Fig. 2.

After the ground floor 5 has set and become sufficiently hard, then bay-size floor panels or floor units 6 are poured in the several bays on the ground floor 5 and one on another to form a stack of floor units, as shown in Fig. 3. The floor units which are poured in each bay are preferably of a size and shape to constitute the upper floors of the bay. If the floor units are of concrete, each unit will preferably be provided with the necessary reinforcing rods 8 and such rods will be of a length to project slightly beyond the edges of the floor unit or panel.

When each floor unit or panel 6 is poured, it is formed at each corner with a notch 9 adapted to receive a portion of one of the columns, and each floor unit is also made with a central opening 12 for a purpose presently to be described.

After the stack of floor units 6 have been poured and the steel frame of the building is completed by extending the columns 3 to the desired height and installing the necessary beams and girders 10 by which the columns are connected and which provide the supporting elements for the various upper floors, then the floor panels or units in each stack may be raised one by one to an upper floor level and deposited on the beams or girders of the steel frame, which, as stated above, may be so placed that they bound the various bays at each floor level. Each floor panel is of such a size that when it is placed in its permanent position at any floor level its edges overlie the horizontal floor supporting elements 10 that bound the bay at said level and the columns which define the bay occupy the notches 9 at the corners of the floor panel as seen in Figs. 9 and 11. The raising of the floor units in each bay can be accomplished by the crane or derrick 13 by which the column sections are hoisted into place for extending the columns and by which the beams and girders are lifted into position to be attached to the columns. In other words, the lifting of the floor units from the stacks of floor units to a proper level is accomplished by the same lifting mechanism used in building the frame and does not involve the employment of any special lifting equipment for this purpose.

Figure 5:
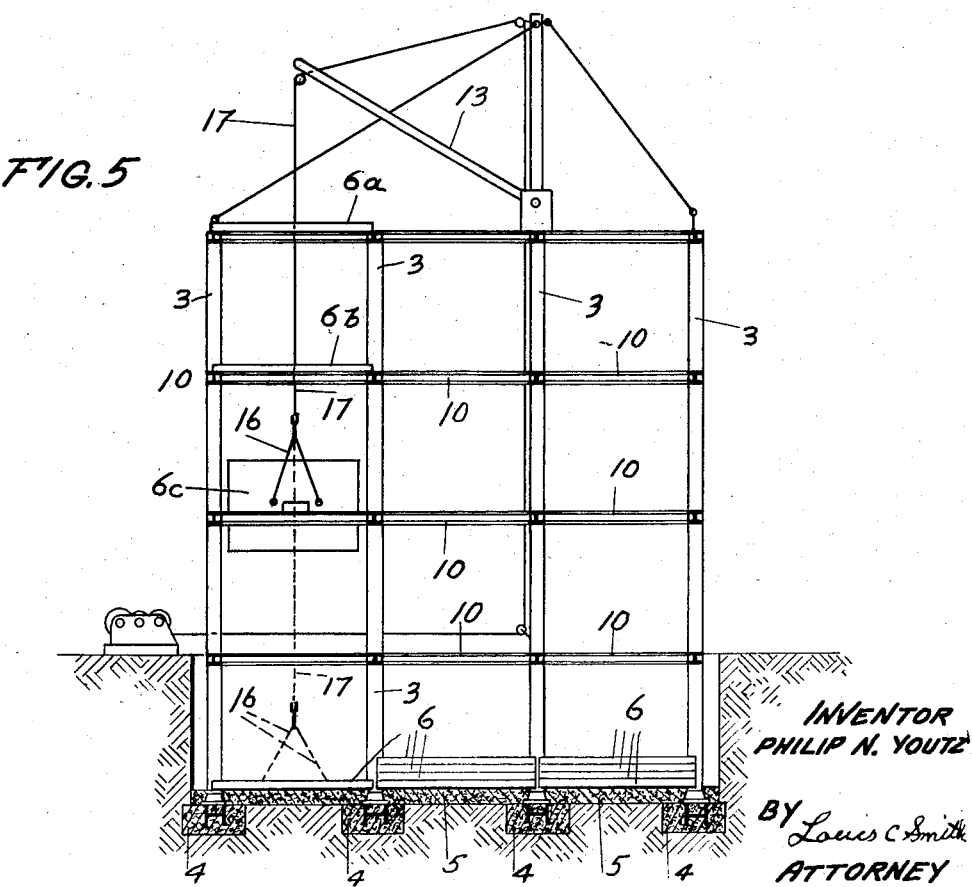
Fig. 5 illustrates the steel frame of the building as having been completed and the operation of raising the individual floor units to upper floor levels.

In the operation of raising any floor unit from its position in the stack of floor units to a proper level, such floor unit is first shifted from the horizontal position in which it was poured into a vertical position, as shown in Fig. 5, and is also swung into a position diagonally of the bay, as shown in dotted lines in Fig. 4. The diagonal dimension of the bay is greater than the transverse dimension of the floor unit so that when the floor unit is in its vertical diagonal position it can be raised in the bay without interference from the horizontal floor supporting elements of the framework. When the floor unit has thus been placed in a vertical diagonal position, it is then lifted to a proper level while in such diagonal position and is deposited on or secured to the beams and girders at such upper level. As stated above the floor panels have such a size that when each panel has been raised and deposited on the horizontal floor supporting elements 10 of any bay at an upper floor level the edges of the floor panel will overlie and rest on the floor supporting elements 10 that bound the bay at such level.

For raising each floor unit it may be cast with eyes or loops 15 to which the sling 16 may be attached, said sling being connected to the fall 17 of the derrick in the usual manner. If desired, the eyes or loops 15 may be placed slightly to one side of the middle position of the floor unit so that as the floor unit is lifted from the stack it will be sufficiently overbalanced on one edge thus facilitating turning it into the vertical position shown in Figs. 5 and 8. The workmen can then swing the floor unit into its diagonal position, in which position it will be held as it is raised to the upper level. When it has been lifted to any prescribed level the floor unit will be turned out of its diagonal position into a position which parallels one side of the bay, and it can then be lowered into a horizontal position resting on the beams and girders 10 with the notches 9 in the corners thereof fitting around the columns which outline the bay, as shown in Fig. 4.

In raising the floor units in any bay the top floor unit of the stack may be lifted to the top of the steel frame and placed on top thereof to constitute the roof unit for such bay, as shown at 6a in Fig. 5. The fall of the derrick 13 can then be lowered through the opening 12 in the floor unit 6a, Fig. 5, and may be attached to the next floor unit to be raised, and the latter can be raised in the bay, as described above, and deposited on the beams and girders which constitute the floor support for the top story of the building, as shown at 6b in Fig. 5.

After the floor unit 6b has been laid, the fall 14 of the derrick will be lowered through the openings 12 in the two raised floor units and attached to the next floor unit to be raised, as shown in dotted lines Fig. 5, and the latter can then be raised and deposited on the beams and girders for the floor of the story of the building directly beneath the top story, and these operations are continued until all of the floor units in the stack of floor units in any bay have been raised and placed in position.

With this arrangement the floor units are lifted and deposited in position from the top of the bay down to the bottom, the roof unit 6a for the bay being first placed in position and then the other floor units for the bay being laid in regular order.

When the floor units of the stacks in the various bays have been raised and placed in position as above described the floor for each story of the building will be composed of the various floor units for said story, and when the units have been deposited on the beams and girders, the adjacent edges of adjacent floor units will be spaced from each other slightly since the transverse dimension of each floor units as they are cast is slightly less than the overall transverse dimension of the bay, although such transverse dimension of the floor panel is sufficiently greater than the distance between the inner faces of the beams or girders on the opposite sides of the bay so that when a floor panel or unit has been raised to an upper level and deposited in its permanent position at such upper level, its edges will overlie and rest on the beams or girders at such level and the columns defining said bay will occupy the notches 9 at the corners of the floor panel as best seen in Figs. 9 and 11. When the floor units have been thus laid to constitute the floor of any story of the building, the projecting ends of the reinforcing rods 8 in adjacent edges of adjacent floor units will overlap each other, as shown in Fig. 9 at 18, and such overlapping ends may be welded together, thus tieing the adjacent floor units together. The space between the adjacent edges of adjacent floor units may then be filled with suitable grouting so as to bond the floor units together and make a continuous floor surface and structure throughout the extent of the building.

I have described above the operation of carrying out my improved method of building by laying the floor units in any bay from the top down. It is also possible to carry out my improved method of laying the floors in any bay from the bottom up. This may be done by leaving one bay or a complete row of bays empty of floor units, such empty bay or bays serving as a vertical shaft or shafts for hoisting panel units, and then moving a panel in a full bay laterally into an empty bay, and by means of the crane raising the panel thus moved slightly and turning it to a vertical position, and then raising it the full height of the building in said empty bay and swinging the raised panel into a position over the bay from which it was poured and lowering it in said bay to the desired floor level where it is placed in permanent horizontal position on the beams and girders. In carrying out this operation the first panel which is moved from a stack of panels into the empty bay and then raised in said bay and transferred into the bay from which it is removed may be lowered in said latter bay and placed on the beams and girders at the second floor level. Another panel can be similarly moved from the stack of panels laterally into the empty bay and then raised in said bay the full height of the building and transferred by the crane into a position over the bay from which it was taken and then lowered to the third floor level and placed in its permanent horizontal position on the beams and girders. This operation may be continued until all the floors have been permanently placed in position in the bay in which they were poured, the placing of the panels in position being from the bottom up.

While any suitable means may be employed for transferring a floor panel from a stack of panels laterally into an adjacent empty bay, yet a device such as a dolly 20 makes a convenient apparatus for this purpose. The dolly 20 preferably has an inclined or tilted bed 21, and if desired can be mounted on caster-type wheels. In making the transfer of a floor panel from a stack of panels in one bay laterally into an adjacent empty bay, the floor panel may be raised a few feet off the top of the stack on which it is supported, and the dolly 20 may then be moved under it and the floor unit lowered onto the inclined bed 21 of the dolly. In order to transfer the dolly into the empty bay, suitable blocking or bridge construction consisting of I-beams laid on their sides or channels laid on their backs and spanning the empty bay may be used. The dolly carrying the floor panel may be moved onto the bridge thus constructed and into a position centrally of the empty bay. The I-beams or channels serve to guide the dolly in its movement. When the dolly has been placed centrally of the empty bay, then the floor panel may be raised from the dolly upwardly in said empty bay by the crane as above described and then transferred by the crane to a position over the bay in which it is to be placed.

The tilted or inclined position of a floor panel on the dolly will permit the floor panel to clear the columns in passing from one bay into the other.

Figure 15:
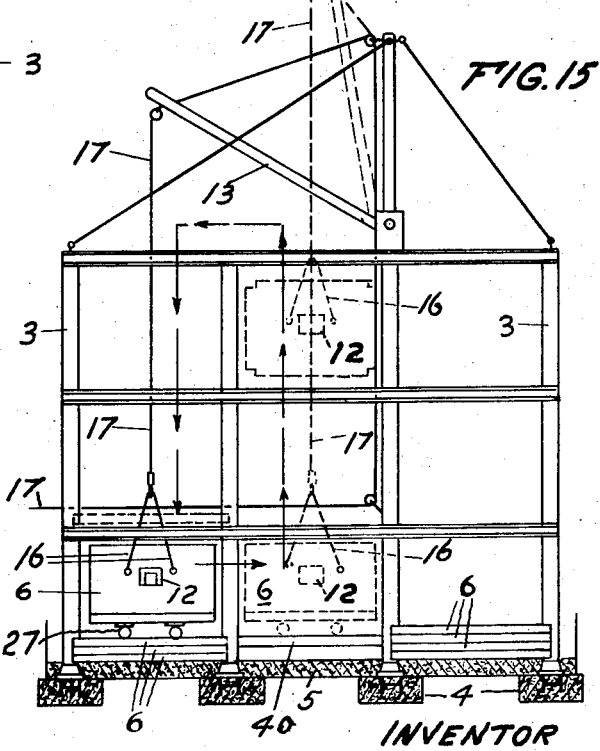
Fig. 15 is a view representing the operation of laying the floor panels from the bottom up, said figure being substantially a section on the line 16—16, Fig. 17.
Figure 17:
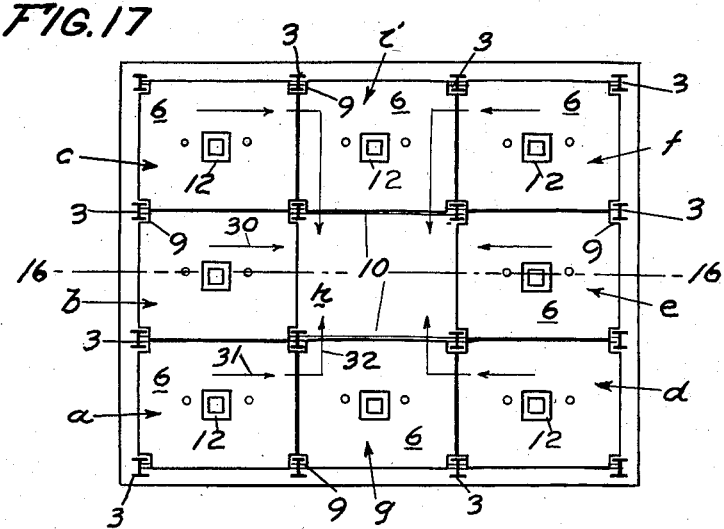
Fig. 17 is a plan view of Fig. 15.
Figure 18:
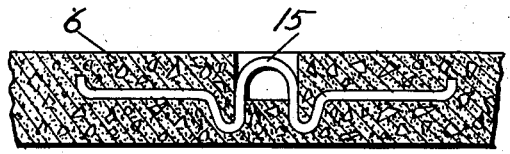
Fig. 18 is an enlarged sectional view showing the manner in which the eye 15 is molded into the floor unit.

This operation which involves the use of an empty bay for the purpose of laying the floor panels in any other bay from the bottom up is illustrated diagrammatically in Figs. 15 and 17. Fig. 17 is in the nature of a plan view of a building in which the columns 3 divide said building into nine bays indicated at $a$, $b$, $c$, $d$, $e$, $f$, $g$, $h$, and $i$, the center bay $h$ being an empty bay and each of the other bays having a pile or stack of floor panels therein. Fig. 15 is in the nature of an elevation taken on the line 15—15, Fig. 17.

In laying the floor panels 6 which have been poured in the bay $b$, for instance, the top floor panel of the stack may be raised by the crane 13 sufficiently so that the dolly 20 may be placed underneath it, and said floor panel may then be lowered onto the inclined platform of the dolly. The dolly then with the floor panel thereon may be moved in the direction of the arrow 30 onto the blocking or bridging 40 in the empty bay $h$ and the crane 13 may be used to raise the floor panel from the dolly through the empty bay $h$ to a point above the framework of the building and then to lower the floor panel in the bay $b$ to the second floor level where it may be placed permanetly on the beams and girders.

The fall 17 of the crane may then be lowered through the central opening 12 of the floor panel which has just been placed at the second floor level and attached to the floor panel then forming the top of the stack of floor panels in bay $b$, and said latter floor panel may be raised a few feet to a point sufficient to permit the dolly to be rolled under it and then said panel may be lowered onto the dolly. The dolly may then be moved laterally into the bay $h$ and the crane 13 may be employed to raise the floor panel from the dolly through the empty bay to a point above the frame of the building and then lower it into the bay $b$ to the third floor level where it may be placed on the beams and girders.

By repeating the same operation the bottom panel of the stack of panels which were poured in bay $b$ may be raised through the empty bay and placed on top of the framework to function as a roof panel.

In a similar manner the panels which have been poured in bays $g$, $i$, and $e$ may be raised through the empty bay $h$ and deposited in the bays from which they were taken from the bottom up or in a reverse order to that in which they were poured.

This operation is illustrated diagrammatically in Fig. 15 which shows the second floor panel 6 mounted on the dolly 20 in bay $b$ and which also shows in dotted lines the dolly with the floor panel thereon as having been transferred to bay $h$ and being partially raised therein, and which also shows in dotted lines said panel as having been transferred by the crane into bay $b$ and lowered therein to the second floor level. The arrow indicates the path through which the floor unit travels during the above operation.

To lay the panels in the bays $a$, $c$, $d$, and $f$, from the bottom up, or in reverse order in which they were poured, necessitates loading the top panel of the stack onto a dolly as above described and then moving the dolly into an adjacent bay, and then from said adjacent bay into the empty bay, an operation which involves giving the dolly two separate movements in directions at right angles to each other. For instance, the top panel of the stack in bay $a$ may be lifted and placed on the dolly as above described, and then the dolly may be moved laterally as indicated by the arrow 31, Fig. 17, into the bay $g$, and from the bay $g$ into the empty bay as shown by the arrow 32, after which the panel may be raised in the empty bay and transferred back into bay $a$ at a point above the building and then lowered in said bay to its designated floor level. The arrows 31 and 32 indicate the movements which the dolly may make in transferring the floor panels from the corner bays into the empty bay preparatory to raising such panels in the empty bay.

When the floor panel is transferred from one bay to another as from bay $a$ to bay $g$, the bed 21 of the dolly must be tilted at an angle about a horizontal axis extending in the direction in which the floor panel is to be moved in order that the panel may be moved freely between the columns separating the two bays.

When the panel has been transferred in said bay $g$ then in order to transfer it into the empty bay $h$ it is necessary to tilt the platform 21 of the dolly about a horizontal axis extending in the direction in which the dolly is to be moved from the bay $g$ into the bay $h$.

To provide for this the bed 21 of the dolly herein shown is mounted on a ball and socket support indicated at 42 which permits the bed to be tipped into different inclined positions.

After the dolly with the floor panel mounted on its bed has been moved from bay $a$ into bay $g$, then the bed 21 may be levelled up and then tipped in a direction at right angles to that which it occupied when traveling from bay $a$ to bay $g$, and in the latter position the panel carried by the dolly will be positioned so that it can be moved freely between the columns 3 dividing bays $g$ and $h$.

Figure 13:
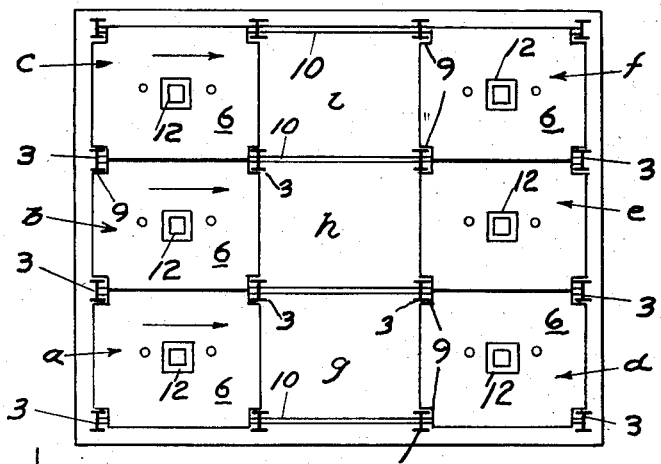
Fig. 13 is a plan view of Fig. 12.
Figure 14:
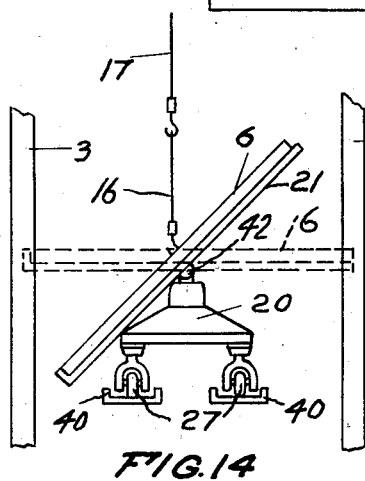
Fig. 14 illustrates a dolly which may be used for moving the individual floor panels laterally from one bay to another.

I have referred above to a building operation in which only one of a series of bays is left empty, stacks or piles of floor panels having been poured in each of the other bays. In Fig. 13 I have shown a slightly different arrangement wherein a row of bays is left empty, piles of floor panels 6 having been poured in the other bays. As shown in said figure the building being erected has three rows of three bays each, the bays of the central row being left empty. The bays in which the floor panels 6 have been poured are indicated at *a, b, c, d, e, f,* and the empty bays at *g, h, i.* In raising the floor panels as shown in Fig. 13 and placing the panels of each stack in the bay in which they were poured but in reverse order from that in which they were poured, the floor panels in each bay can be moved laterally into an adjacent empty bay and then raised in said empty bay and transferred into the upper end of the bay from which they were poured, and placed at the desired floor levels.

The empty bay, such as shown at *b* in Fig. 17, may be used to receive an elevator shaft or for any other purposes and the same is true of the empty bays *g, h, i,* in Fig. 13.

If, however, it is desired to employ floor panels in an empty bay, it would be possible to pour the necessary floor panels in said empty bay after the other floor panels were properly placed in position and then to raise the floor panels in said bay, which was formerly an empty bay, one by one and place them on the beams and girders from the top down as described above.

While I have referred above to a building operation which includes pouring the floor panels in stacks in various bays and then completing the steel framework, and subsequently raising the floor panels to their appropriate floor levels and placing them on the beams and girders of the building, yet my improved method may be carried out by raising the panels from the stacks and placing them on beams and girders in various bays while the steel framework is being erected. If, for instance, the building is to have several stories, then after the framework has been raised two or three stories, the crane which is being used in handling the beams and girders and column sections can be used for raising some of the floor units and placing them temporarily on beams and girders of the portion of the framework already erected, thereby to provide a temporary floor directly beneath the workmen employed in erecting the steel framing, thus providing an important safety feature.

As the erection of the steel framing proceeds these floor panels which have been temporarily raised can be elevated to a higher level so that the placing of the floor panels temporarily in position on the beams and girders may follow closely the erection of the steel frame.

It will, therefore, be possible to place a floor panel in each bay temporarily at each floor level as the framework is rising, or at least at every other floor level. Thus the workman employed in erecting the frame will always have a floor beneath him within one or two stories.

If the floor panels are being laid from the bottom up, they may be placed in their permanent positions as fast as the steel frame is erected, so that the workmen erecting the frame will always have a protective floor a short distance beneath them.

The openings 12 in the various floor panels make it possible to reach down through any raised floor panel and pick up a lower floor panel which has been temporarily placed on beams or girders and lift said floor panel to a higher level.

Figure 16:
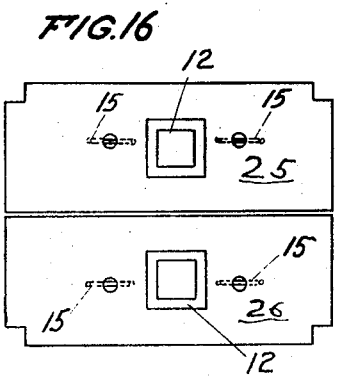
Fig. 16 is a view showing the floor element for a single bay in the form of two units.

The various floor panels or units may be poured in units of the size of the bays in which they are to be placed, in which case each floor panel will constitute the entire floor area for said bay at each floor level. Or, the floor panels or units may be poured in smaller size so that two or more units will be required to make a complete floor for each bay. In Fig. 16 the floor for one of the bays is shown as constituted by two separate units 25, 26 which, of course, have to be laid side by side to make the complete floor for any bay.

It will be understood that after the floor panels or units have been placed in their permanent positions, the opening 12 in each such floor unit will be filled in some suitable way, as by means of a trap door or plug 28 of concrete or other suitable material.

Figure 19:
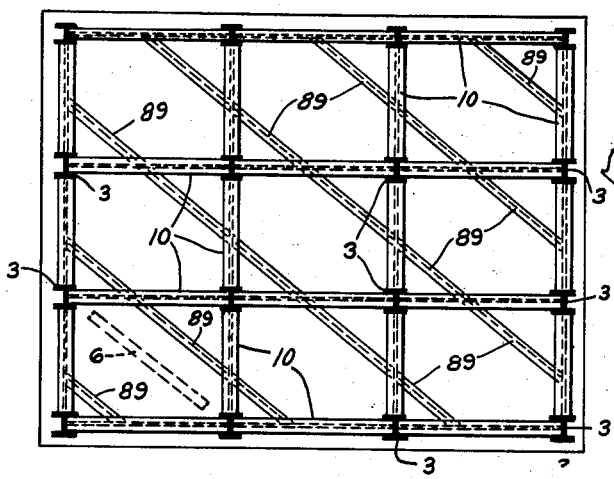
Fig. 19 is a plan view of a steel frame of a building which is designed to accommodate floor panels that are placed between the beams of the frame.
Figure 21:
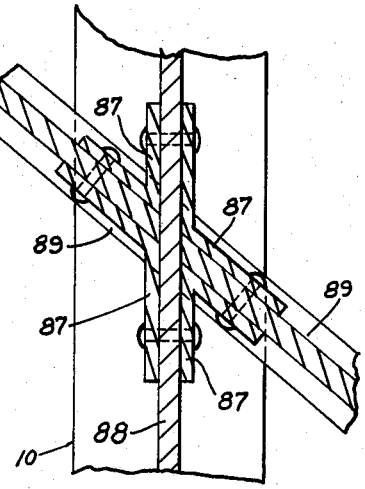
Fig. 21 is an enlarged section on the line 21—21, Fig. 20.
Figure 20:
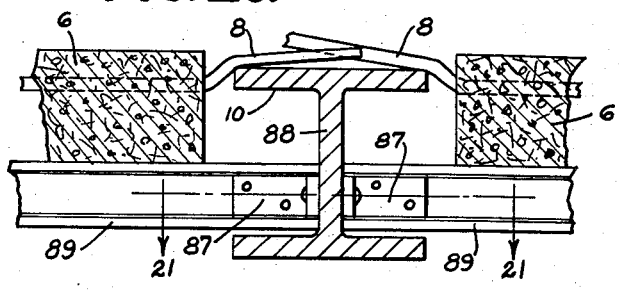
Fig. 20 is a fragmentary sectional view showing support means for the floor panels when they are placed between the beams of the frame instead of on the beams.

I have referred above to laying each floor unit in position by placing it on top of the girders and beams 10 which support it. In Figs. 19 to 21 there is shown a different construction in which the floor units are placed between and at substantially the same level as the main supporting beams 10. This construction involves the use of some supplemental support means for each floor unit by which it is connected to the main beams 10. In said figures such supplemental support means is in the form of floor-unit supporting members 89 which extend across the bays and are secured to the webs 88 of the beams 10, as by connecting brackets 87. Such support mmbers 89 may extend across the bays in any direction, but preferably in a direction at an angle to the beams 10 as shown in Fig. 19, and there will preferably be two or more support members extending across each bay. The arrangement shown in Fig. 19 leaves one diagonal dimension of each bay free and clear for raising a floor unit therein as shown in dotted lines in Fig. 19.

These support members 89 are located sufficiently below the top surface of the beams 10 so that when the floor units 6 are placed thereon the top surface of each unit is slightly above or even may be flush with the top surface of the beam as shown in Fig. 20.

With the construction shown in Figs. 19–21 each floor unit is cast with transverse dimensions which permit it to be placed between the beams 10 instead of on top of the beams as shown in Fig. 11. An advantage of the construction shown in Figs. 19–21 is that by means of it the height of a multi-story building is reduced. In the construction shown in Fig. 11 in which the floor panels rest on the beams 10 each story of the multi-story building includes in its vertical dimension the combined vertical dimension of the beam 10 and the vertical dimension or thickness of the floor unit 6, while in the construction shown in Fig. 20 in which the floor units 6 are located between and at the same level as the beam, each story of a multi-story building includes in its vertical dimension substantially only the vertical dimension of the beam 10. If the floor units are 8 or 10 inches thick a ten-story building constructed as shown in Fig. 11 would be 80 or 100 inches (6.66 or 8.33 feet) taller than a building constructed as shown in Fig. 21.

Figure 22:
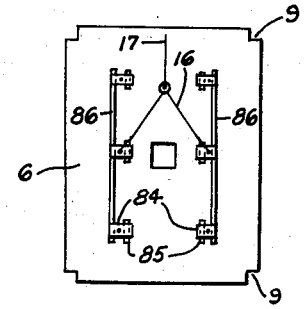
Fig. 22 is a view showing a floor panel which has been reinforced by "stiff-legs" to strengthen it while it is being raised.
Figures 23, 24:
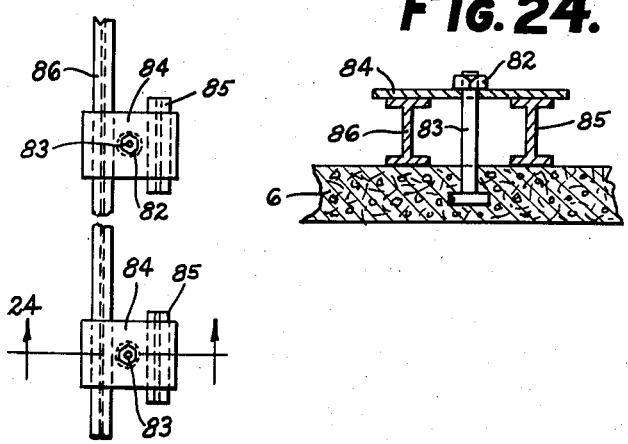
Fig. 23 is a fragmentary plan view of one of the "stiff-legs"
Fig. 24 is an enlarged section on the line 24, Fig. 23.

If a building is being constructed with relatively large bays it may be desirable to reinforce each floor unit as it is being raised thereby eliminating the danger of the unit cracking. This can be done in various ways, one of which is to detachably secure one or more so called "stiff-legs" 86 to the face of each floor unit. In Fig. 22 two "stiff-legs" are shown. These "stiff-legs" may be detachably secured to the floor unit in any suitable way. As shown in the drawings, they are attached by means of bolts 83 which are anchored in the floor unit and each of which passes through an anchoring plate 84 which rests at one edge on a "stiff-leg" and at the other edge on a support 85 that rests on the floor unit. Each bolt 83 has a clamping nut 82 screw-threaded thereon, and by tightening the nuts the "stiff-leg" will be firmly clamped in place. In the drawing I have shown three clamping bolts for each "stiff-leg," but any number may be used depending on the size of the floor unit. When a floor unit is reinforced by detachable "stiff-legs" the sling 16 by which the unit is raised may be attached to one of the clamping bolts 83.

While I have shown one way of supporting the floor units when they are located between the beams, and one way of detachably securing the "stiff-legs" to such units, yet various other ways of accomplishing these objects may be employed without departing from the invention.

If desired the beams 10 may have centering fins or strips 80 welded to the top face thereof to assist in properly locating any floor unit when it has been raised and is being placed in position on the beams.

I claim:
1. The process of erecting a building having a steel frame composed of columns and horizontal floor sup- porting elements connecting said columns at various floor levels, which process consists in erecting said steel frame, some of the columns of which define a rectangular bay and some of the horizontal floor supporting elements of which bound said bay at various floor levels, pouring the ground floor of the building in said bay, pouring on the ground floor in said bay and within the limits thereof a reinforced concrete floor panel having the shape of the bay and of a size such that when it is raised to an upper floor level it can be placed in a horizontal position with its edges overlying and resting on the horizontal floor supporting elements that bound the bay at said upper floor level, shifting the position of said reinforced concrete floor panel from the horizontal position in which it was poured into a vertical position extending diagonally of the bay, raising said floor panel in said bay to an upper floor level while it is in said vertical diagonal position and depositing it in a horizontal position on the horizontal floor supporting elements that bound said bay at said upper floor level and with the edges of said floor panel overlying and resting on the horizontal floor supporting elements which bound the bay at said floor level.

2. The process of erecting a multi-story building having a steel frame composed of (1) columns, some of which define a rectangular bay, and (2) horizontal elements connecting said columns at various upper floor levels, which horizontal elements constitute floor supporting means at each of said upper floor levels, which process consists in erecting the steel frame with a column at each corner of said bay and also with horizontal floor supporting elements connected to the columns and extending along each side of each bay at various upper floor levels, pouring the ground floor of the building, pouring on the ground floor within the limits of said bay a plurality of individual concrete floor panels one on another to form a stack of floor panels each of which has a central opening and is of such a size that when it is in its operative position forming the floor of the bay at an upper floor level the edges of the panel overlie and rest on the horizontal floor supporting elements at said level, shifting the position of the top floor panel of the stack from the horizontal position in which it was poured into a vertical position extending diagonally of the bay, raising in the bay and by means of lifting equipment said last named floor panel while it is in its vertical diagonal position to an upper floor level, depositing the raised floor panel in a horizontal position on the floor supporting elements at said level which bound the bay and with the edges of the floor panel overlying and resting on said horizontal floor supporting elements, lowering the lifting equipment through the central opening of the raised floor panel and attaching it to the floor panel which then forms the top floor panel of the stack of remaining floor panels, shifting the position of said last named floor panel from the horizontal position in which it was poured into a vertical position extending diagonally of said bay, raising by said lifting equipment said last named floor panel while it is in its vertical diagonal position to an upper floor level below that at which the previously raised floor panel is located, and depositing said last named floor panel in its operative horizontal position on the horizontal floor supporting elements at said last named floor level with the edges of the floor panel overlying and resting on the horizontal floor supporting elements, and continuing these operations until all of the floor panels of the stack have been raised and deposited on the horizontal floor supporting elements at the various floor levels.

3. The method of erecting a building which has a steel frame presenting columns and horizontal elements connecting said columns at different floor levels and which constitute floor supporting means, which method consists in erecting the steel frame, the columns of which define a plurality of similar rectangular bays and the horizontal elements of which bound the various bays at each floor level, pouring the ground floor of the building, pouring a plurality of individual reinforced concrete floor panels one on another on the ground floor in each of several of the bays to form a stack of individual floor panels in each of said bays while leaving other bays empty of floor panels, transferring the floor panels in any bay one by one from the stack of floor panels in said bay into an empty bay, shifting the position of each floor panel when it has been transferred to an empty bay into a vertical position extending diagonally of said empty bay, raising each floor panel in said empty bay while in said vertical diagonal position to a point above the steel frame and transferring it to a position over a bay other than that in which it was raised and lowering it in said other bay while it is in a vertical position diagonally of said other bay to a designated floor level and depositing it on the floor supporting means at said floor level.

4. Process of erecting a multi-story building having a steel frame composed of columns and horizontal elements connecting said columns at each floor level and constituting floor supporting means, which process consists in erecting said steel frame, the columns of which define a bay which has a longer transverse dimension in one direction than in another direction and the horizontal floor supporting elements bound said bay at each floor level, pouring the ground floor of the building, pouring on the ground floor within the limits of said bay a reinforced concrete floor panel of a shape corresponding to that of the bay and of such a size that when it is raised to an upper floor level it can be placed on the horizontal floor supporting elements at such level with the edges of the panel overlying and resting on said floor supporting elements, shifting the position of said floor panel in said bay from the horizontal position in which it was poured into a vertical position in which a shorter transverse dimension of the panel coincides with the longer transverse dimension of the bay, raising said floor panel in said bay to an upper floor level while it remains in said vertical position, and depositing said raised floor panel on the floor supporting means that bound the bay at said floor level and in a position with the edges of the floor panel overlying and resting on said floor supporting elements.

References Cited in the file of this patent

UNITED STATES PATENTS

| | | |
|---|---|---|
| 1,066,436 | Peltzer | July 1, 1913 |
| 2,006,070 | Stasio | June 25, 1935 |
| 2,014,087 | Mopin | Sept. 10, 1935 |
| 2,037,895 | Gugler | Apr. 21, 1936 |
| 2,686,420 | Youtz | Aug. 17, 1954 |
| 2,758,467 | Brown et al. | Aug. 14, 1956 |

FOREIGN PATENTS

| | | |
|---|---|---|
| 1,085,834 | France | Aug. 4, 1954 |

OTHER REFERENCES

Popular Mechanics, July 1948, pages 158 and 159.